United States Patent
Kazem et al.

(10) Patent No.: US 11,823,470 B2
(45) Date of Patent: Nov. 21, 2023

(54) GENERATING ANALYTIC APPLICATIONS FROM A MEDIA FILE

(71) Applicant: International Business Machines Corporation, Armonk, NY (US)

(72) Inventors: Firas Kazem, Kanata (CA); Anthony Nicola Tasca, Ottawa (CA); Gongjin Zhang, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 17/104,047

(22) Filed: Nov. 25, 2020

(65) Prior Publication Data
US 2022/0164587 A1    May 26, 2022

(51) Int. Cl.
*G06V 20/62* (2022.01)
*G06F 40/103* (2020.01)
*G06F 40/30* (2020.01)
*G06F 40/106* (2020.01)
*G06F 16/35* (2019.01)
*G06V 30/262* (2022.01)
(Continued)

(52) U.S. Cl.
CPC ............ *G06V 20/62* (2022.01); *G06F 18/213* (2023.01); *G06F 18/241* (2023.01); *G06F 40/103* (2020.01); *G06F 40/30* (2020.01); *G06V 30/274* (2022.01); *G06F 40/106* (2020.01)

(58) Field of Classification Search
None
See application file for complete search history.

(56) References Cited

U.S. PATENT DOCUMENTS

| 9,240,061 | B2 |   | 1/2016 | Breedvelt-Schouten |
| 9,858,292 | B1 | * | 1/2018 | Setlur ...................... G06F 16/50 |

(Continued)

FOREIGN PATENT DOCUMENTS

| CN |  | 109240782 A | * | 1/2019 | ............... G06F 8/34 |
| WO | WO-2021261836 A1 | * | 12/2021 | ........... G06K 9/3266 |

OTHER PUBLICATIONS

"BI Migration Services", e-Zest, <https://www.e-zest.com/bi-migration-services>, © 2020, 6 pages.
(Continued)

*Primary Examiner* — Mohammed Rachedine
(74) *Attorney, Agent, or Firm* — Joseph P. Curcuru

(57) ABSTRACT

In an approach to improve generating an analytic application embodiments generate an analytic application from an image. Embodiments determine an orientation, font size, and color of a text, wherein the text is selected from one or more texts that are part of a visualization from the image. Embodiments classify the text using semantic analysis having predetermined criteria to create a result. Furthermore, embodiments bind one or more columns from a dataset to the visualization using the result of the semantic analysis, and apply a selection identified using predetermined criteria, comprising sorting, filtering, grouping, and aggregating, to data of the visualization. Additionally, embodiments create a new color palette having a dominant color in the analytic application, wherein the dominant color is identified as a most recurring color in the visualization of the image, and apply the new color palette to the analytic application.

20 Claims, 6 Drawing Sheets

(51) Int. Cl.
  *G06F 18/213*  (2023.01)
  *G06F 18/241*  (2023.01)

(56) References Cited

U.S. PATENT DOCUMENTS

| | | | |
|---|---|---|---|
| 2009/0288023 A1* | 11/2009 | Hernandez | G06F 9/451 |
| | | | 715/762 |
| 2013/0195361 A1* | 8/2013 | Deng | G06V 10/462 |
| | | | 382/195 |
| 2015/0213048 A1* | 7/2015 | Goldberg | G06F 16/1748 |
| | | | 707/692 |
| 2015/0220572 A1 | 8/2015 | Svarovsky | |
| 2017/0032050 A1* | 2/2017 | Kol | G06F 8/36 |
| 2017/0371856 A1 | 12/2017 | Can | |

OTHER PUBLICATIONS

"BI Platform & Cloud Migrations". Senturus Inc., <https://senturus.com/analytics-platform-migrations/>, © 2020, 4 pages.

"WebPlotDigitizer", Web based tool to extract data from plots, images, and maps Launch, <https://automeris.io/WebPlotDigitizer/>, Version 4.3 Released (Jul. 7, 2020), 2 pages.

Zhang et al., "Feature Extraction From Dashboard Visualizations," U.S. Appl. No. 63/017,766, filed Apr. 30, 2020, 45 pages.

Anonymous, "Visualization Recommendation System Using a Hybrid Machine Learning Approach," an IP.com Prior Art Database Technical Disclosure, IP.com Number: IPCOM000260192D, Oct. 30, 2019, 4 pages.

\* cited by examiner

```
{
    "widgets": [
        {
            "type": "column chart",
            "layout": {
                "left": "15px",
                "top": "15px",
                "height": "45px",
                "width": "45px"
            },
            "data": [
                {
                    "name": "Brooklyn ",
                    "value": "124"
                },
                {
                    "name": "Bronx",
                    "value": "87"
                }
            ],
            "text": [
                {
                    "value": "Business Analytic Dashboard",
                    "layout": {
                        "left": "35px",
                        "top": "5px",
                        "height": "40px",
                        "width": "80px"
                    }
                }
            ],
            "color": [
                "value": "#2DACA4",
                "value": "#2DACA0"
            ]
        }
    ]
}
```

FIG. 2A

{ title: 'Revenue by Product Line', x-axis-title: 'Revenue', x-axis-labels: ['0', '20M', '40M', '60M', '80M', ...], y-axis-title: 'Product Line', y-axis-labels: ['Personal Accessories', 'Camping Equipment', 'Golf Equipment', ...], data-points: ['118M', '104M', '46.5M', '26.9M', '4.99M'] }

FIG. 2B

GENERATING ANALYTIC APPLICATIONS FROM A MEDIA FILE

BACKGROUND OF THE INVENTION

The present invention relates generally to the field of analytic applications, and more particularly to generating an analytic application from a media file.

Analytic applications are a type of business application software, used to measure and improve the performance of business operations. More specifically, analytic applications are a type of business intelligence. As such they use collections of historical data about business operations to provide business users with information and tools that allow them to make improvements in business functions. It may extend further to predictive analytics, or predictive analysis may form part of the analytic application—depending on both the subject matter under analysis, and the nature of the analysis required. Analytic applications are typically described as a subset of performance management. They specifically relate to the analysis of a business process (such as sales pipeline analysis, accounts payable analytics, or risk adjusted profitability analysis) in support of decision making. To qualify as an application (rather than simply as a data warehousing tool), these tools should promote some form of automation. The maturity level of this automation is as follows: reading data from a nominated operational system into a data warehouse optimized for analysis (data led automation), reports, dashboards and scorecards based on that data structure (reporting led automation), what-if analysis and scenario-modeling (predictive or analytic led automation). In most cases, these three levels are discrete functions, loosely banded together as a single product, and there is little automation of the process from end to end.

SUMMARY

Embodiments of the present invention disclose a method, a computer program product, and a system for generating an analytic application from an image, the computer-implemented method comprising: responsive to determining an orientation, font size, and color of a text, wherein the text is selected from one or more texts that are part of a visualization from the image, classifying the text using semantic analysis having predetermined criteria to create a result; binding one or more columns from a dataset to the visualization using the result of the semantic analysis; applying a selection identified using predetermined criteria, comprising sorting, filtering, grouping, and aggregating, to data of the visualization; creating a new color palette having a dominant color in the analytic application, wherein the dominant color is identified as a most recurring color in the visualization of the image; and applying the new color palette to the analytic application.

BRIEF DESCRIPTION OF THE DRAWINGS

FIG. 2A illustrates one example of features extracted features from a media file, in accordance with an embodiment of the present invention;

FIG. 2B illustrates one example of result creation, in accordance with an embodiment of the present invention;

DETAILED DESCRIPTION

Figure 1:
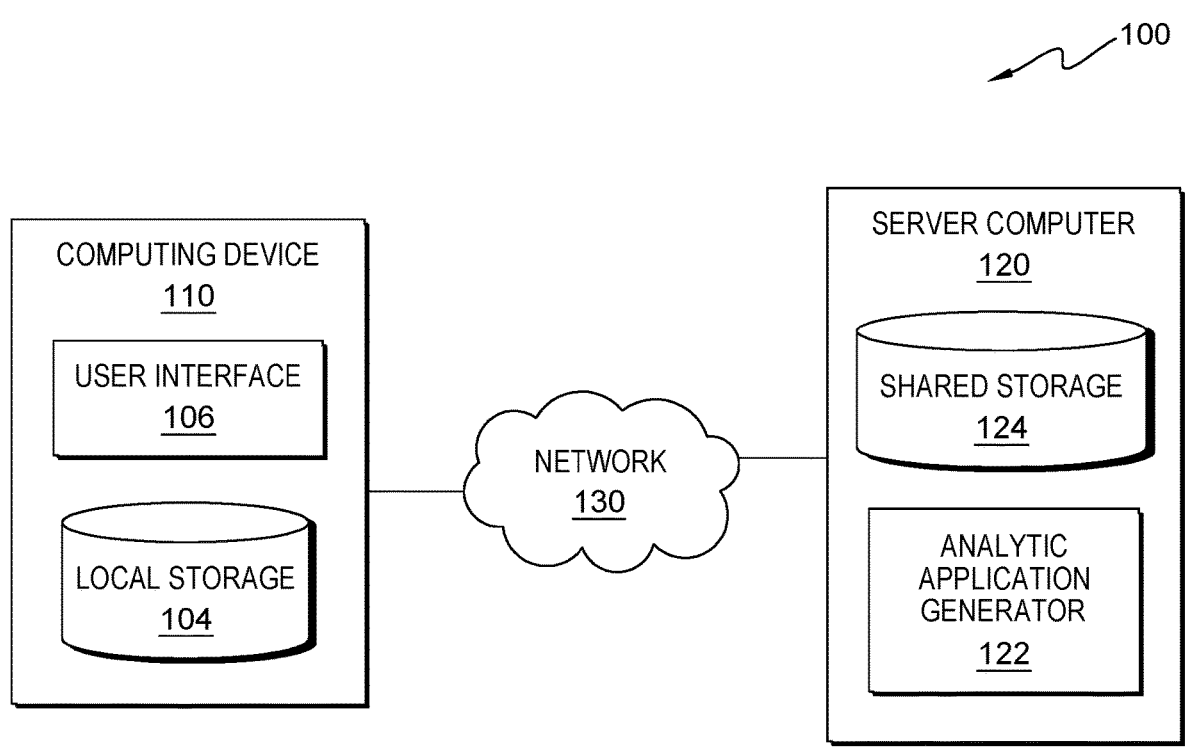
FIG. 1 is a functional block diagram illustrating a distributed data processing environment, in accordance with an embodiment of the present invention.

Embodiments of the present invention recognize that a lot of time and effort can go into building an analytic application (e.g., business analytic application). Embodiments of the present invention recognize one of the main points that users (e.g., customers) face is migrating an existing business analytic application over to a new system. Embodiments of the present invention recognize that users also face the same problem if the users want to migrate from older versions of an analytics application or system to a newer analytics application or system. Embodiments of the present invention recognize that users find it difficult to convert from a report to a dashboard or vice versa.

Embodiments of the present invention generate an analytic application (dashboard/report) from an image. Embodiments of the present invention process a media file (e.g., an image) by extracting one or more features from the media file, wherein the one or more features comprise, but are not limited to, the positions of a visualization in the application, the type of each visualization, the data points in a visualization, the text in the application, and the most commonly used colors in an application. Some embodiments of the present invention assume that one or more datasets for the dashboard/report have been identified. Some embodiment of the present invention execute based on one or more predetermined datasets and/or predetermined dashboard/report.

Embodiments of the present invention solve the particular problems, stated above, by (i) extracting from a media file (e.g., an image) a set of features comprising: positions of each visualization in the business analytic application, a type of each visualization, data points in each visualization, text in the business analytic application, including associated bounding boxes, and relative positions in the business analytic application and most commonly used colors in an analytic application (e.g., business analytic application); (ii) placing the set of features extracted on a canvas associated with the business analytic application; (iii) classifying the text using semantic analysis with predetermined criteria to create a result; (iv) binding columns from a dataset to the visualization of the business analytic application using the result of the semantic analysis of the text for a respective visualization; (v) applying a data selection, wherein the data selection is identified using predetermined criteria, comprising: sorting, filtering, grouping and aggregation, to data of the respective visualization; (vi) creating a new color palette having a dominant color in the business analytic application determined as a most recurring color in an original media file (e.g., image); and (vii) applying the new color palette to the business analytic application.

Implementation of embodiments of the invention may take a variety of forms, and exemplary implementation details are discussed subsequently with reference to the Figures (i.e., FIG. 1-FIG. 5).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 5.

User interface (interface) 106 provides an interface for analytic application generator (application generator) 122, via computing device 110. Computing device 110, via user interface 106, may enable a user and/or a client to interact with application generator 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 5. In some embodiments server computer 120 may represent a plurality of server computers.

Each of shared storage 124 and local storage 104 may be a data/knowledge repository and/or a database that may be written and/or read by one or a combination of application generator 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In the depicted embodiment, application generator 122 is executed on server computer 120. In other embodiments, application generator 122 may be executed on computing device 110. In various embodiments of the present invention, not depicted in FIG. 1, application generator 122 may execute on a plurality of server computers 120 and/or on a plurality of computing devices 110. In some embodiments, application generator 122 may be located and/or executed anywhere within distributed data processing environment 100 as long as application generator 122 is connected to and/or communicates with computing device 110, and/or server computer 120, via network 130.

Application generator 122 may process a media file (e.g., an image) by extracting one or more features from the media file, as depicted in FIG. 2A, wherein the one or more features comprise, but are not limited to, the positions of visualizations in the application, the type of each visualization, the data points in a visualization, the text in the application, and the most commonly used colors in an application (e.g., colors of the text, objects, and/or background in the application). FIG. 2A illustrates one example of extracted features from a media file, generally designated 200. Application generator 122 may use the layout and visualization type information from the extracted features to place the appropriate visualizations on the application's canvas. In various embodiments of the present invention, if a chart type is unsupported by a system, then application generator 122 will replace the unsupported chart with a chart containing similar characteristics (for example, a column chart can be replaced with a bar chart). As part of this step, application generator 122 may will place any graphics or images (e.g. company logo) that are cropped from the original input image. In various embodiments of the present invention, application generator 122 executes a text assignment. In various embodiments of the present invention, the features extracted from the media file (e.g., image) comprise: text, the text's bounding boxes, and the text's relative positions in the business analytic application. Application generator 122 may process the text in order to determine: (i) whether the text is vertically or horizontally rotated, (ii) the text's font size and color, and (ii) whether the text is part of a visualization display.

Application generator 122 may assign the dashboard/report title by looking for one or more texts in the feature set in a predefined location. If the detected text is outside the bounding boxes of visualizations, it is then considered a text widget, wherein special attention is given to global filters. For example, global filters applied to a dashboard or report are displayed in text format at the top of the application. In this example, if text that is outside the bounds of a visualization is located in a predefined area that is known to be where global filters are displayed in the system (i.e., special attention), then application generator 122 infers that that text relates to a global filter. If a text widget has a predefined location in the application, then the text widget may be considered and analyzed by application generator 122. Otherwise, application generator 122 may compare the text against column names in a dataset to determine the probability that the text widget is in-fact a filter widget.

In some embodiments of the present invention, the dataset is predetermined. If the detected text is inside the bounding boxes of visualizations, then application generator 122 may classify the detected text as either: the title of the visualization, the title of an axis of the visualization, the labels on an axis of a visualization, and/or data points on the visualization. In various embodiments of the present invention, application generator 122 classifies the text using semantic analysis with predetermined criteria to create a result, wherein the result is the classification of each text component in a visualization into one of the following, but not limited to: title, axis title, legend label, or data point, as shown in FIG. 2B. FIG. 2B depicts one particular embodiment of the present invention.

In various embodiments of the present invention, when classifying the text, application generator 122 takes into account the following: (i) the output of conducting semantic analysis on the text, wherein application generator 122 may match the text against columns in the datasets and data values of columns in the dataset, wherein text with multiple matched columns are more likely to be classified as titles (e.g., "Revenue by Country" is most likely a visualization title), wherein text that matches against data values of a column are classified as such (e.g., California is most likely an axis title or a data point on the visualization); (ii) the font size, wherein bigger fonts tend to be reserved for titles of visualizations, and the smallest fonts for data points; (iii) the text orientation, wherein text that's oriented vertically is most likely a y-axis Title or an x-axis label; and/or (iv) keeping track of the previously classified text and its stylistic attributes (e.g. font size and color), and then leveraging the previously classified text and its stylistic attributes in future classification steps. For example, if application generator 122 classifies "text A" as a widget title based on semantic analysis, then application generator 122 will use the historic data information from "text A" to classify other text(s) as widget titles if the other text(s) have the same stylistic attributes as "text A."

Application generator 122 may bind columns from a dataset to the visualizations of the Dashboard/Report. In various embodiments of the present invention, application generator 122 utilizes the output of the semantic analysis done on identified text (described above) for a visualization by analyzing the visualization title, analyzing the title of the axis of the visualization and analyzing the labels (e.g., legend titles in visualization) and data point. In various embodiments of the present invention, by analyzing the visualization title, application generator 122 identifies the columns bounded to the visualization. For example, a visualization that has the title "Sales by Product", application generator 122 will identify that the two data columns used are sales and product. For example, application generator 122 passes the string "Sales by Product" to a semantic search system (or a similar system) to identify columns in the dataset that relate to the word "Sales" or the word "Product." In this particular example, if two columns in the dataset exist and are related to those words (either directly from their column titles, or through a knowledge discovery system that has attributed ontological concepts to those columns) then the semantic search system would notify the user directly or through application generator 122.

Figure 3:
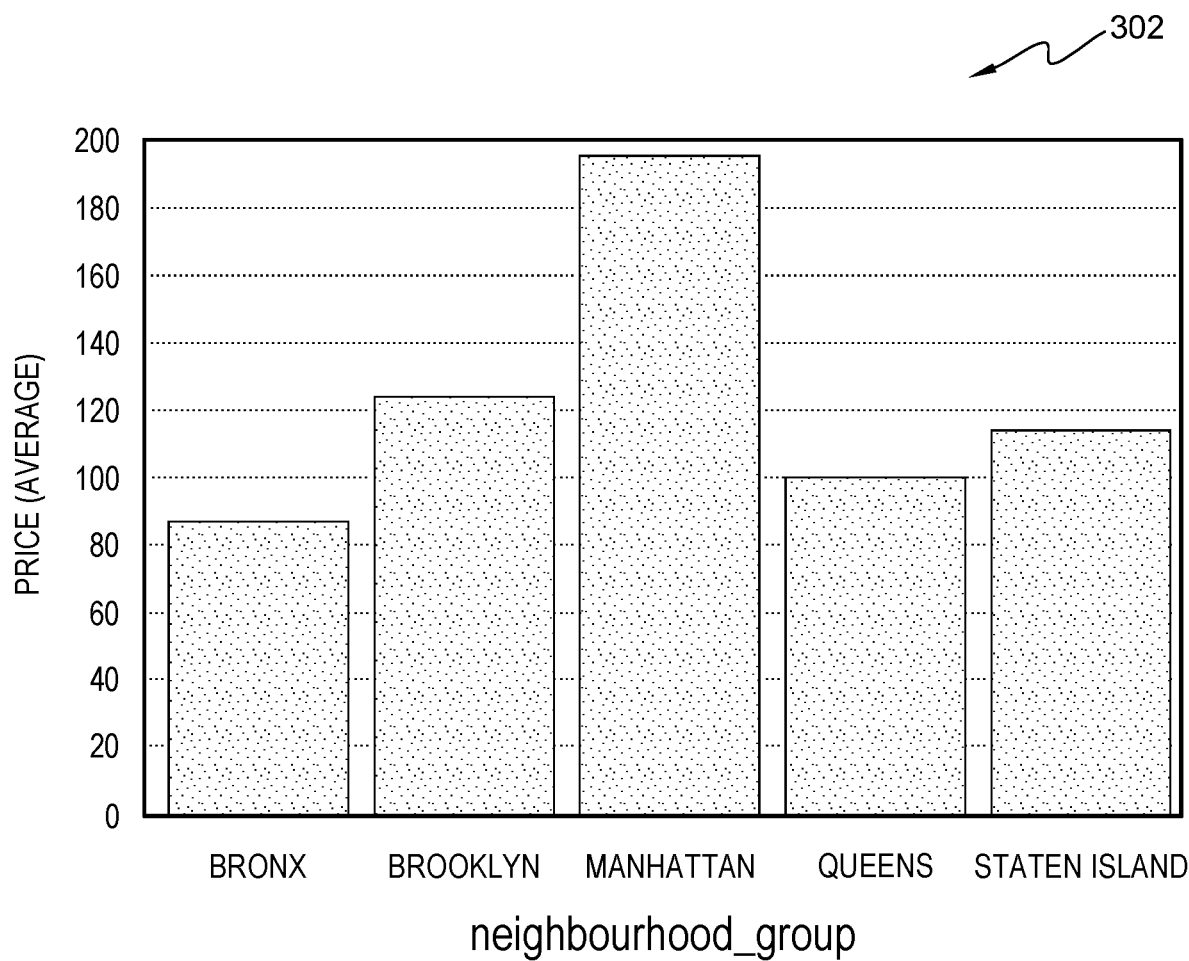
FIG. 3 illustrates one specific example, in accordance with an embodiment of the present invention.

In various embodiments of the present invention, by analyzing the titles of the axis of the visualization, application generator 122 identifies which column is bounded to which slot. For example, column chart 302 with an x-axis named "neighborhood group" and a y-axis named "price" table 304, as depicted in FIG. 3, application generator 122 will analyze the dataset to identify the two data columns that are bound to each slot. In various embodiments of the present invention, by analyzing the labels and data points, application generator 122 identifies the columns bounded to the visualization. For example, depicted in FIG. 3, table 304, contains the extracted data points from column chart 302, application generator 122 will analyze the dataset to identify the column that possesses the values: "Bronx", "Brooklyn", "Manhattan", "Queens", and "Staten Island." By using the visual recommender, application generator 122 may be able to match the list of extracted columns with the appropriate slots of the visualization.

Application generator 122 may analyze the text and bounded data columns to determine the sorting, filtering, grouping and aggregation that are applied to the data of a visualization. Application generator 122 may determine if filters are applied to the visualization by analyzing the visualization title. In various embodiments of the present invention, application generator 122 may determine if filters are applied to the visualization by analyzing the visualization title using a natural language processing (NLP) service. For example, given a visualization with the title "Country Population in 2019", application generator 122 will identify that the data columns are about population in each country and that the applied filter is the 2019 year. Application generator 122 may determine the type of sorting that is applied by analyzing the text in the visualization. For example, given a visualization with the title "Top Populated Countries", application generator 122 will identify that the data columns are associated with population in each country and that the columns are sorted to show the top values. In another example, if the labels of the x-axis are ordered alphabetically (e.g. Apple, Banana, Orange), then application generator 122 may infer that sort order.

Application generator 122 may determine the type of aggregation that is applied to a visualization by analyzing the values of the data points in the visualization. In various embodiments of the present invention, application generator 122 runs one or more supported aggregations on the columns in question and compares those results with the values of the data points. For example, for the "Top Populated Countries" visualization, if the average aggregations of the population column for each country yields the same value as what was extracted from the data points in the visualization, then an average aggregation is selected. Application generator 122 may determine the number of groupings applied to the visualization by analyzing the data point and axis labels. For example, if a measure column is assigned to a categorical slot, as in the case of "Annual Salary by Age", and if application generator 122 counts five extracted labels or data points (18 years (yrs), 25 yrs, 35 yrs, 45 yrs, 65 yrs) for an axis of a visualization, and the number of distinct counts for the Age column is larger than five, then application generator concludes that the Age column was grouped into five bins.

Application generator 122 may use the colors extracted from the image to create a new color palette. Application generator 122 may construct the color palette such that the dominant color in the dashboard/report is a the most frequent recurring color in the original image. In some embodiments of the present invention, the new color palette is predetermined. In another embodiment, application generator 122 may recommend datasets to the user that match the concepts and statistics extracted from the text of the dashboard/report image.

Figure 4:
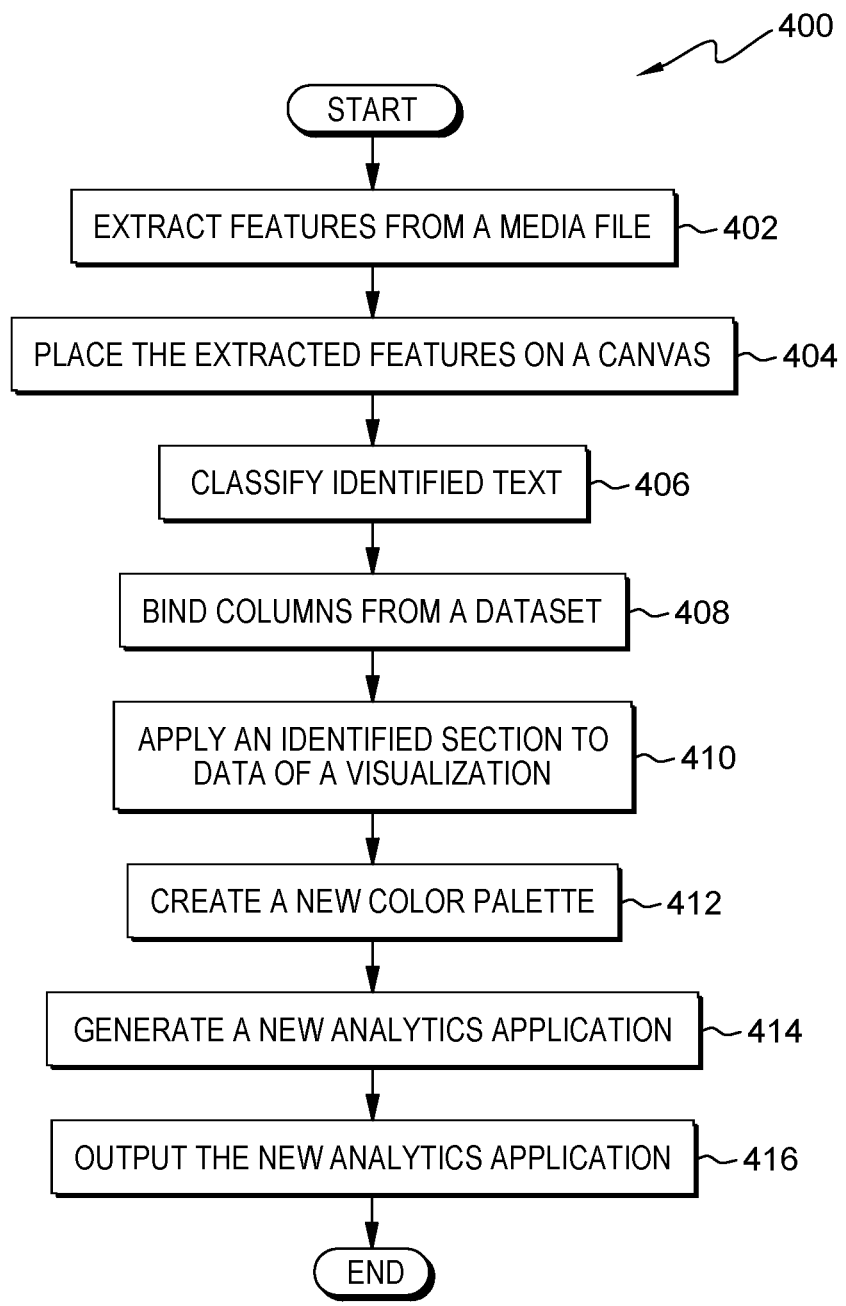
FIG. 4 illustrates operational steps of a hierarchical search component, on a server computer within the distributed data processing environment of FIG. 1, for video searching and identification, in accordance with an embodiment of the present invention.

FIG. 4 illustrates operational steps of application generator 122, generally designated 400, in communication with computing device 110, within distributed data processing environment 100 of FIG. 1, for executing a heuristic video search, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, application generator 122 extracts features from a media file. In various embodiments of the present invention, application generator 122 extracts one or more features from one or more media files, wherein the one or more features comprise, but are not limited to, the positions of a visualization in the application (i.e., visualization), the type of each visualization, the data points in a visualization, the text in the application, and the most commonly used colors in an application.

In step 404, application generator 122 places the extracted features from the media file on a canvas. In various embodiments of the present invention, application generator 122 places the extracted features from the media file on one or more canvas. For example, in response to extracting from the image, of a business analytics artifact, a set of features comprising positions of each visualization in a business analytic application, a type of each visualization, data points in each visualization, text in the business analytic application, including associated bounding boxes, and relative positions in the business analytic application and most commonly used colors in the business analytic application, application generator 122 places the set of features extracted from the image on a canvas associated with the business analytic application.

In step 406, application generator 122 classifies identified text in the extracted features from the media file. In various embodiments of the present invention, application generator 122 determines the orientation, the font size and color, and the text that is part of a visualization from the extracted features. In various embodiments of the present invention, in response to determining and identifying the extracted text orientation, font size and color, and the text that is part of a visualization, wherein application generator 122 classifies the text using semantic analysis with predetermined criteria to create a result, wherein the text may be the extracted text.

In step 408, application generator 122 binds columns from a dataset. In various embodiments of the present invention, application generator 122 binds columns from a dataset to the visualization of the analytic application using the result of the semantic analysis of the text for a respective visualization.

In step 410, application generator 122 applies an identified section to data of a visualization. In various embodiments of the present invention, application generator 122 identifies a selection of data using predetermined criteria comprising sorting, filtering, grouping and aggregation. In various embodiments of the present invention, application generator 122 applies the identified selection of data to data of the respective visualization.

In step 412, application generator 122 creates a new color palette. In various embodiments of the present invention, application generator 122 creates a new color palette having a dominant color in the analytic application determined as a most recurring color in an original image.

In step 414, application generator 122 generates a new analytics application. In various embodiments of the present invention, application generator 122 generates a new analytics application based on the extracted features, text assignments, text analysis, and/or new color palette. In various embodiments of the present invention, application generator 122 applies the new color palette to the generated new analytic application (e.g., a new business analytic application).

In step 416, application generator 122 outputs the new analytics application to a user. In various embodiments of the present invention, application generator 122 outputs and executes the new analytics application to a user, via computing device 110.

Figure 5:
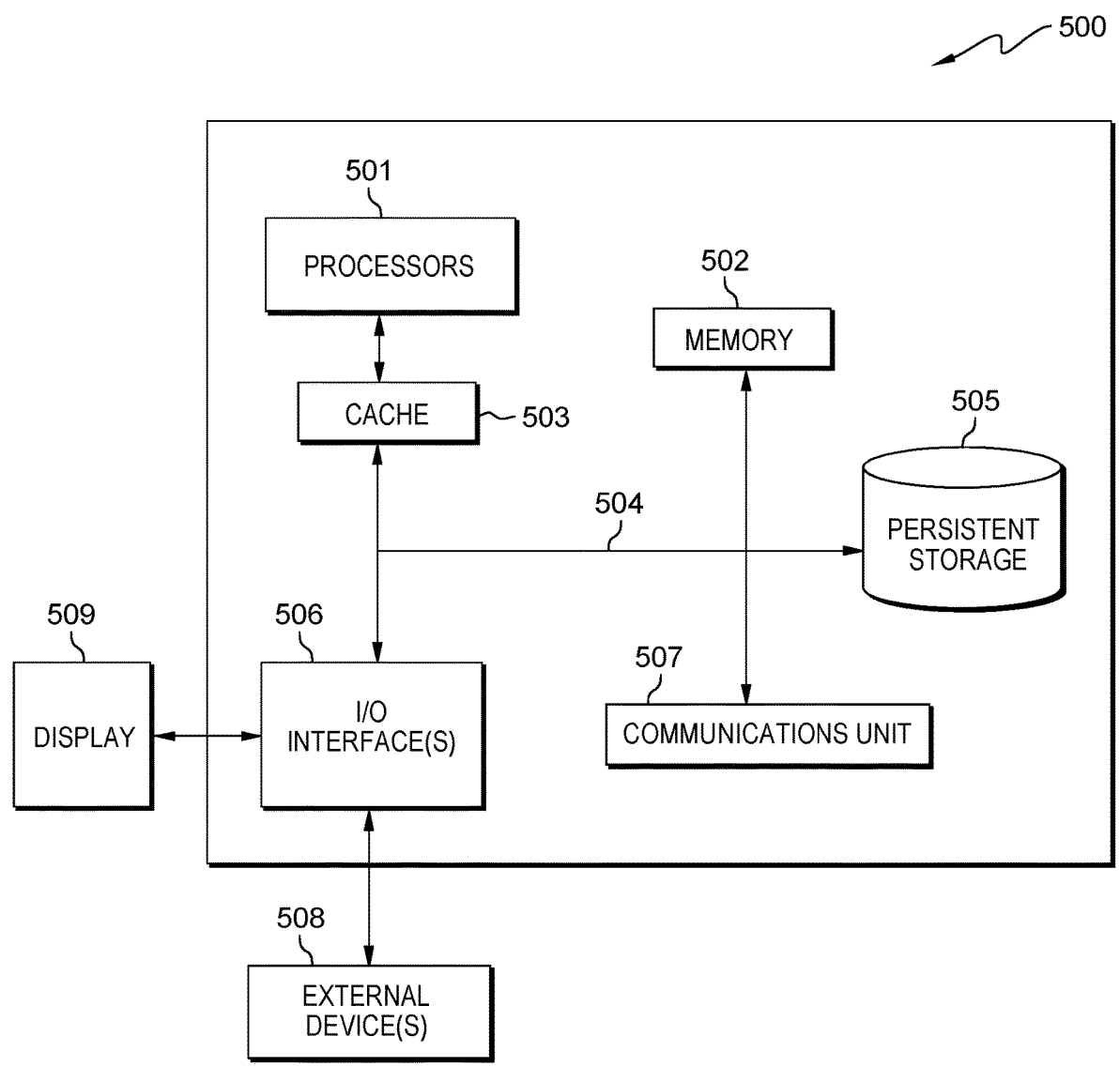
FIG. 5 depicts a block diagram of components of the server computer executing the data synchronization component within the distributed data processing environment of FIG. 1, in accordance with an embodiment of the present invention.

FIG. 5 depicts a block diagram of components of server computer 120 within distributed data processing environment 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 depicts computer system 500, where server computing 120 represents an example of computer system 500 that includes application generator 122. The computer system includes processors 501, cache 503, memory 502, persistent storage 505, communications unit 507, input/output (I/O) interface(s) 506, display 509, external device(s) 508 and communications fabric 504. Communications fabric 504 provides communications between cache 503, memory 502, persistent storage 505, communications unit 507, and input/output (I/O) interface(s) 506. Communications fabric 504 may be implemented with any architecture designed for passing data and/or control information between processors (such as microprocessors, communications, and network processors, etc.), system memory, peripheral devices, and any other hardware components within a system. For example, communications fabric 504 may be implemented with one or more buses or a crossbar switch.

Memory 502 and persistent storage 505 are computer readable storage media. In this embodiment, memory 502 includes random access memory (RAM). In general, memory 502 may include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 enables for input and output of data with other devices that may be connected to each computer system. For example, I/O interface 506 may provide a connection to external devices 508 such as a keyboard, keypad, a touch screen, and/or some other suitable input device. External devices 508 may also include portable computer readable storage media such as, for example, thumb drives, portable optical or magnetic disks, and memory cards. Software and data used to practice embodiments of the present invention may be stored on such portable computer readable storage media and may be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating an analytic application from an image, the computer-implemented method comprising:

responsive to determining an orientation, font size, and color of a text, wherein the text is selected from one or more texts that are part of a visualization from the image, classifying the text using semantic analysis having predetermined criteria to create a result;

binding one or more columns from a dataset to the visualization using the result of the semantic analysis;

applying a selection identified using predetermined criteria, comprising sorting, filtering, grouping, and aggregating, to data of the visualization;

creating a new color palette having a dominant color in the analytic application, wherein the dominant color is identified as a most recurring color in the visualization of the image; and applying the new color palette to the analytic application.

2. The computer-implemented method of claim 1, further comprising:

extracting one or more features from the image, wherein the one or more features comprise: positions of one or more visualizations in the analytic application, a type of each of the one or more visualizations, data points in the one or more visualizations, the text in the analytic application, and the most recurring color in the analytic application.

3. The computer-implemented method of claim 2, further comprising:

placing extracted features from the image on one or more canvases.

4. The computer-implemented method of claim 2, further comprising:

generating a new analytic application, based on the extracted features, text assignments, text analysis, and the new color palette; and applying the new color palette to the generated new analytic application.

5. The computer-implemented method of claim 4, further comprising:

outputting, by a computing device, the new analytic application to a user.

6. The computer-implemented method of claim 5, further comprising:

executing, by the computing device, the new analytic application.

7. The computer-implemented method of claim 1, further comprising:
recommending datasets to a user that match concepts and statistics extracted from the image.

8. A computer program product for generating an analytic application from an image, the computer program product comprising:
one or more computer readable storage devices and program instructions stored on the one or more computer readable storage devices, the stored program instructions comprising:
responsive to determining an orientation, font size, and color of a text, wherein the text is selected from one or more texts that are part of a visualization from the image, program instructions to classify the text using semantic analysis having predetermined criteria to create a result;
program instructions to bind one or more columns from a dataset to the visualization using the result of the semantic analysis;
program instructions to apply a selection identified using predetermined criteria, comprising sorting, filtering, grouping, and aggregating, to data of the visualization;
program instructions to create a new color palette having a dominant color in the analytic application, wherein the dominant color is identified as a most recurring color in the visualization of the image; and
program instructions to apply the new color palette to the analytic application.

9. The computer program product of claim 8, further comprising:
program instructions to extract one or more features from the image, wherein the one or more features comprise: positions of one or more visualizations in the analytic application, a type of each of the one or more visualizations, data points in the one or more visualizations, the text in the analytic application, and the most recurring color in the analytic application.

10. The computer program product of claim 9, further comprising:
program instructions to place extracted features from the image on one or more canvases.

11. The computer program product of claim 9, further comprising:
program instructions to generate a new analytic application, based on the extracted features, text assignments, text analysis, and the new color palette; and
program instructions to apply the new color palette to the generated new analytic application.

12. The computer program product of claim 11, further comprising:
program instructions to output, by a computing device, the new analytic application to a user.

13. The computer program product of claim 12, further comprising:
program instructions to execute, by the computing device, the new analytic application.

14. The computer program product of claim 8, further comprising:
program instructions to recommend datasets to a user that match concepts and statistics extracted from the image.

15. A computer system for generating an analytic application from an image, the computer system comprising:
one or more computer processors;
one or more computer readable storage devices;
program instructions stored on the one or more computer readable storage devices for execution by at least one of the one or more computer processors, the stored program instructions comprising:
responsive to determining an orientation, font size, and color of a text, wherein the text is selected from one or more texts that are part of a visualization from the image, program instructions to classify the text using semantic analysis having predetermined criteria to create a result;
program instructions to bind one or more columns from a dataset to the visualization using the result of the semantic analysis;
program instructions to apply a selection identified using predetermined criteria, comprising sorting, filtering, grouping, and aggregating, to data of the visualization;
program instructions to create a new color palette having a dominant color in the analytic application, wherein the dominant color is identified as a most recurring color in the visualization of the image; and
program instructions to apply the new color palette to the analytic application.

16. The computer system of claim 15, further comprising:
program instructions to extract one or more features from the image, wherein the one or more features comprise: positions of one or more visualizations in the analytic application, a type of each of the one or more visualizations, data points in the one or more visualizations, the text in the analytic application, and the most recurring color in the analytic application.

17. The computer system of claim 16, further comprising:
program instructions to place extracted features from the image on one or more canvases.

18. The computer system of claim 16, further comprising:
program instructions to generate a new analytic application, based on the extracted features, text assignments, text analysis, and the new color palette;
program instructions to apply the new color palette to the generated new analytic application; and
program instructions to output, by a computing device, the new analytic application to a user.

19. The computer system of claim 18, further comprising:
program instructions to execute, by the computing device, the new analytic application.

20. The computer system of claim 15, further comprising:
program instructions to recommend datasets to a user that match concepts and statistics extracted from the image.

* * * * *